(12) United States Patent
Bircann et al.

(10) Patent No.: US 6,453,934 B1
(45) Date of Patent: Sep. 24, 2002

(54) SHAFT BRUSH FOR PREVENTING COKING IN A GAS MANAGEMENT VALVE

(75) Inventors: Raul A. Bircann, Penfield; Dwight O. Palmer, Rochester, both of NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/778,538

(22) Filed: Feb. 7, 2001

(51) Int. Cl.$^7$ ............................................. F16K 11/00
(52) U.S. Cl. .................. 137/242; 251/129.15
(58) Field of Search .................. 123/568.21, 188.6; 251/129.15; 137/242

(56) References Cited

U.S. PATENT DOCUMENTS

| | | | | |
|---|---|---|---|---|
| 2,055,287 A | * | 9/1936 | Giraud | 137/242 |
| 3,716,069 A | * | 2/1973 | Reynolds | 251/214 X |
| 4,061,157 A | * | 12/1977 | Hanssen | 137/242 |
| 4,081,171 A | * | 3/1978 | Morgan et al. | 251/30.02 |
| 4,253,642 A | * | 3/1981 | Adams | 137/242 X |
| 4,408,627 A | * | 10/1983 | Harris | 137/242 |
| 4,497,335 A | * | 2/1985 | Masuda | 251/61.5 X |
| 4,725,040 A | * | 2/1988 | Fornuto et al. | 251/129.15 |
| 5,511,531 A | * | 4/1996 | Cook et al. | 123/568 |
| 5,666,932 A | * | 9/1997 | Bauerle et al. | 123/571 |
| 6,212,881 B1 | * | 4/2001 | Takahashi et al. | 123/568.21 |

* cited by examiner

Primary Examiner—Lesley D. Morris
Assistant Examiner—John Bastianelli
(74) Attorney, Agent, or Firm—Patrick M. Griffin

(57) ABSTRACT

The present invention is directed to an annular metal-bristled brush for cleaning the pintle shaft of a pintle valve, such as an exhaust gas recirculation valve for an internal combustion engine, to prevent coking and failure of the valve. The brush surrounds the shaft, the tips of the bristles making contact with the shaft with sufficient force to dislodge incipient coke deposits but with insufficient force to inhibit the axial motion of the pintle shaft in actuation. Preferably, the brush is disposed in an annular space in the valve body between the pintle shaft bearing and the gas-metering chamber such that the shaft is brushed in both directions during each actuative cycle of the valve. Preferably, the annular space is slightly larger both axially and radially than the corresponding dimensions of the brush so that the brush is free to float without binding the pintle shaft.

9 Claims, 3 Drawing Sheets

SHAFT BRUSH FOR PREVENTING COKING IN A GAS MANAGEMENT VALVE

TECHNICAL FIELD

The present invention relates to pintle-type valves; more particularly to axially-operative pintle shaft valves for permitting the controlled admission of exhaust gases into the fuel intake manifold of an internal combustion engine; and most particularly to such a valve having an annular shaft brush for preventing coking of the portion of the pintle shaft which engages the shaft bearing, thereby preventing coking product from entering the bearing and causing seizure of the shaft.

BACKGROUND OF THE INVENTION

It is well known in the automotive art to provide a variable valve connecting the exhaust manifold with the intake manifold of an internal combustion engine to permit selective and controlled recirculation of a portion of an engine's exhaust gas into the fuel intake stream. Such recirculation is beneficial for reducing the burn temperature of the fuel mix in the engine to reduce formation of nitrogen and sulfur oxides which are significant components of smog. Such a valve is known in the art as an exhaust gas recirculation (EGR) valve.

Typically, an EGR valve has a valve body enclosing a chamber disposed between a first port in the exhaust manifold and a second port in the intake manifold; a valve seat dividing the chamber between the two ports; a valve pintle shaft having a valve head fitted to the valve seat and extending from the valve head through a bearing mounted in a third port in a sidewall of the valve body; a spring-retained bearing splash shield; and a solenoid actuator mounted on the exterior of the valve body and operationally connected to the outer end of the valve pintle.

A problem inherent to EGR valve applications is that the managed fluid (exhaust gas) is moisture-laden, corrosive, and dirty with particulates. Especially in diesel engines, the exhaust gas can form coke-like deposits, known generally as coking, on surfaces exposed to these materials including the valve chamber walls and the head-actuating pintle shaft. The pintle shaft typically passes through a journal bearing disposed in a wall of the valve body which provides radial support and axial guidance to the shaft. To minimize gas leakage along the shaft, the clearance between the bore in the bearing and the pintle shaft typically is made as small as is practical without causing significant drag on the axial actuation of the pintle by the external actuator. If the valve is normally closed, as is typical, a protected and clean portion of the pintle shaft within the bearing bore must become extended into the valve chamber when the pintle is actuated to open the valve and admit exhaust gas into the valve chamber. The clean portion of the pintle shaft may become coked, which coking material will be drawn into the bearing bore when the valve is closed. Thus, a typical EGR valve is undesirably vulnerable to becoming seized and inoperative by coking of the pintle shaft during operation.

What is needed is a device which may be fitted to an EGR valve that significantly reduces or eliminates coking of the valve shaft without impairing efficiency, size, and performance of the valve and actuator. Preferably, such a device is simple and inexpensive to fabricate and install.

SUMMARY OF THE INVENTION

The present invention is directed to an annular metal-bristled brush for cleaning the pintle shaft of a pintle valve, such as an exhaust gas recirculation valve for an internal combustion engine, to prevent coking and failure of the valve. The brush surrounds the shaft, the tips of the bristles making contact with the shaft with sufficient force to dislodge incipient coke deposits but with insufficient force to inhibit the axial motion of the pintle shaft in actuation. Preferably, the brush is disposed in an annular space in the valve body between the pintle shaft bearing and the gas-metering chamber such that the shaft is brushed in both directions during each actuative cycle of the valve. Preferably, the annular space is slight larger both axially and radially than the corresponding dimensions of the brush so that the brush is free to float without binding the pintle shaft.

BRIEF DESCRIPTION OF THE DRAWINGS

The foregoing and other objects, features, and advantages of the invention, as well as presently preferred embodiments thereof, will become more apparent from a reading of the following description in connection with the accompanying drawings, in which.

DESCRIPTION OF THE PREFERRED EMBODIMENT

Figure 1:
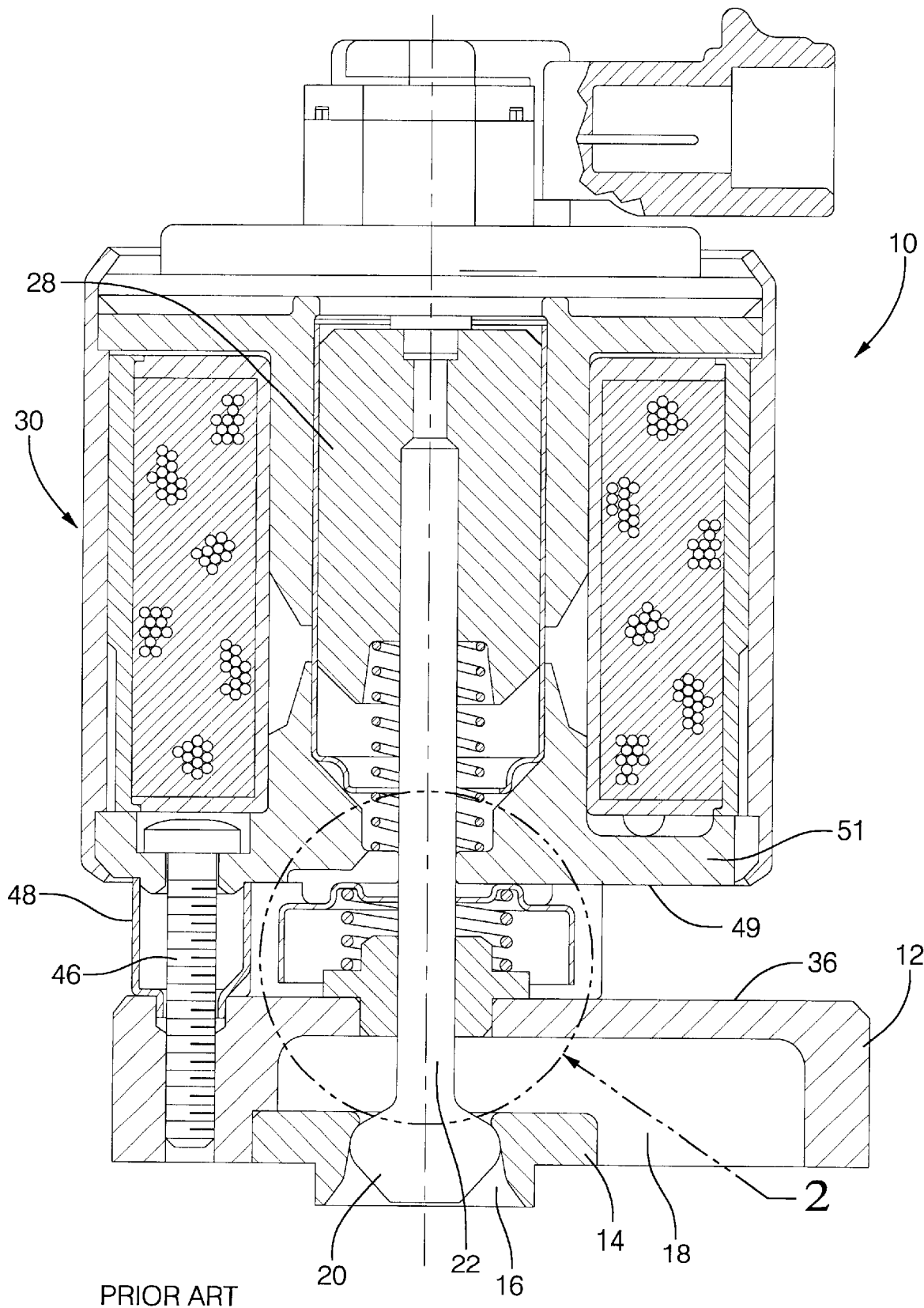
FIG. 1 is an elevational cross-sectional view of a prior art EGR valve.
Figure 2:
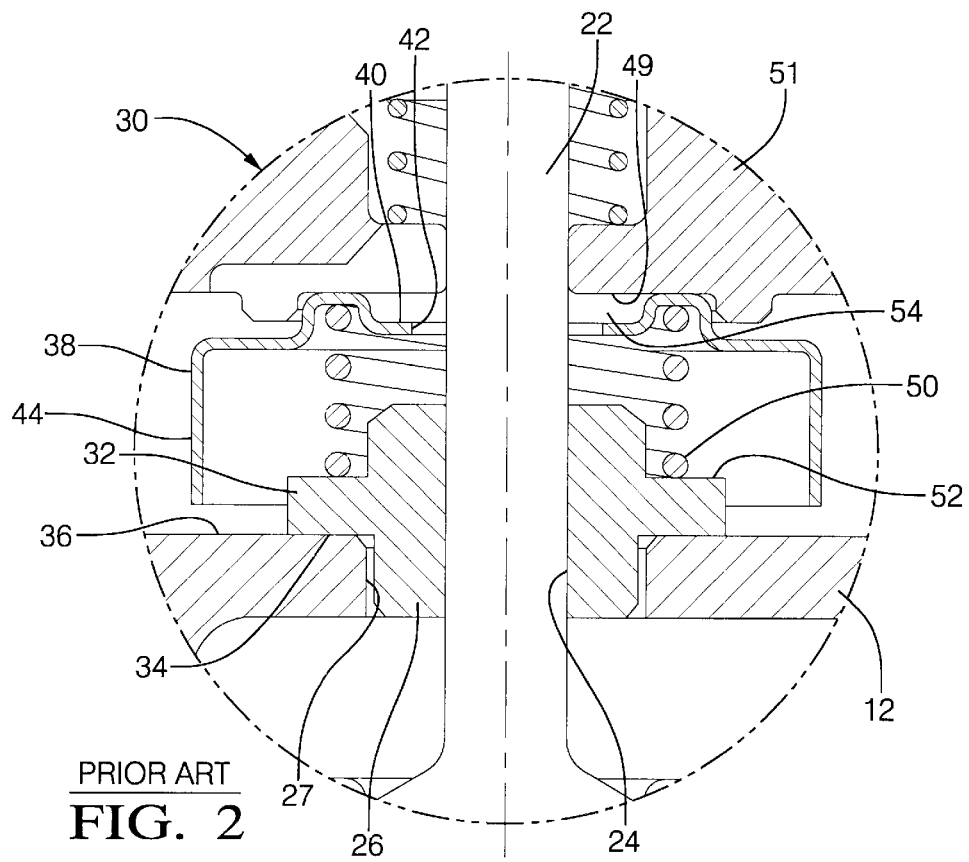
FIG. 2 is an enlarged and detailed view of area 2 in FIG. 1.

The benefits afforded by the present invention will become more readily apparent by first considering a prior art EGR pintle valve. Referring to FIGS. 1 and 2, a prior art EGR valve 10 includes a valve body 12 having a valve-seat 14 separating a first chamber 16 from a second chamber 18, which chambers may communicate with the exhaust and intake systems, respectively, of an internal combustion engine (not shown) or the reverse. Valve head 20 is disposed adjacent to seat 14 for selectively mating therewith to open or to close communication between chambers 16 and 18. Valve stem, or pintle, 22 extends from head 20 through an axial bore 24 in bearing 26 and is captured within armature 28 of solenoid actuator 30. Bearing 26 is disposed in a port 27 in a wall of valve body 12 and guides pintle shaft 22 in reciprocating motion to open and close the valve when actuator 30 is energized and de-energized, respectively.

Bearing 26 is provided with a circumferential flange 32 having a first axial face 34 for sealing against axial outer surface 36 of valve body 12 to prevent leakage of gases therebetween. A cup-shaped bearing splash shield 38 has an inward-extending flange 40 with a central aperture 42 for passage of stem 22, preferably without contact therebetween, and a cylindrical skirt 44 extending axially to shield a substantial portion of bearing 26 from external contaminants. Shield 38 is open in a downwards direction to permit venting of any gases which may leak along bore 24 during operation of the valve. Actuator 30 is connected to valve body 12 via a plurality of bolts 46 extending through a plurality of standoffs 48. A coil spring 50 surrounding stem 22 is disposed within shield 38, being compressed between actuator 30 and a second surface 52 on flange 32 for urging flange 32 to seal against surface 36 under all operating conditions. Spring 50 also serves to urge shield 38 against surface 49 of primary polepiece 51 of actuator 30 to prevent dust intrusion into the actuator.

Figure 3:
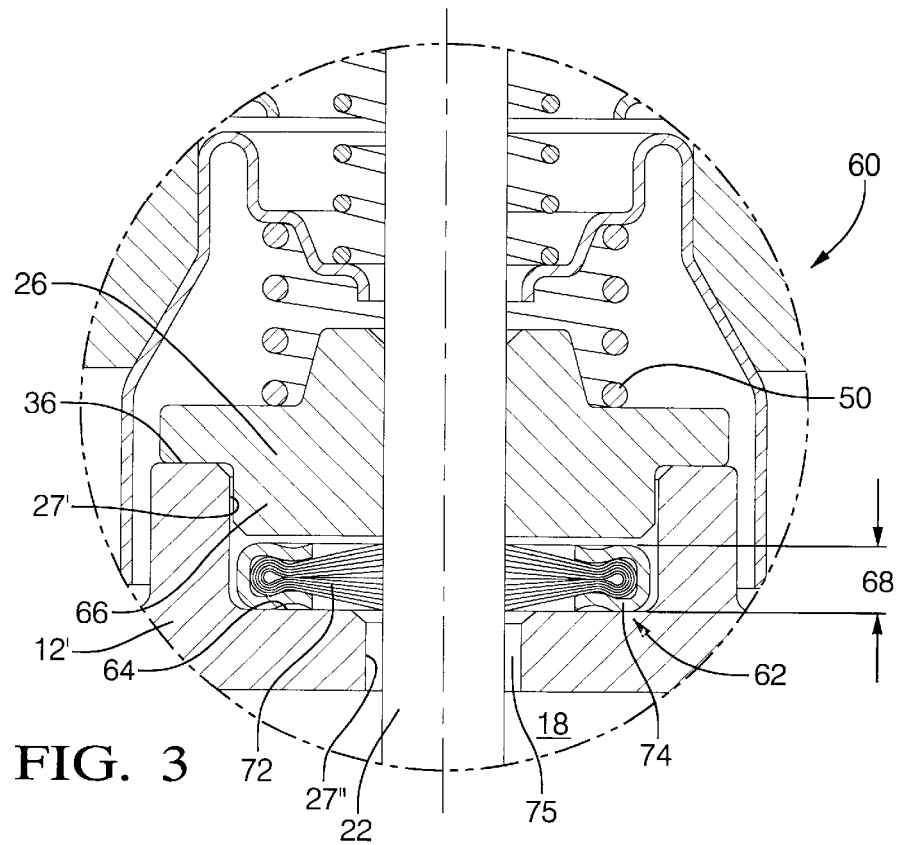
FIG. 3 is an elevational cross-sectional view of a portion of a valve, like that shown in FIG. 2, equipped with an anti-coking shaft brush in accordance with the invention.

Referring to FIG. 3, a portion of an improved pintle-type valve 60 is shown incorporating an annular pintle shaft brush 62 in accordance with the invention. Valve body 12' is provided with a stepped axial bore 27' for coaxially receiving bearing 26, brush 62, and shaft 22. The depth of bore 27' from surface 36 to step 64 is greater than the axial length of portion 66 of bearing 26 such that a first annular space 68 is created surrounding shaft 22 between bearing 26 and valve chamber 18. Within space 68 is disposed an annular brush 62 comprising metallic bristles 72 disposed radially inwards and retained by a folded metallic retainer 74. A line of such brushes, in various sizes and having bristles formed of various materials, is available, for example, from Sealeze, a unit of Jason, Inc., Richmond, Va., USA. The bristles preferably are formed of metal, for example, stainless steel, mild steel, or brass. Other materials may be suitable in some applications. The brush is disposed such that the bristles are generally orthogonal to and radial of shaft 22. Preferably, the outer diameter of brush 62 is slightly less than the diameter of space 68 and the axial length of brush 62 is slightly less than the axial depth of space 68, as shown in FIG. 3, such that brush 62 is free to float slightly, both axially and radially, within space 68. Preferably, the inner diameter of the annulus formed by the bristle ends is substantially the same as the diameter of pintle shaft 22 to provide effective brushing action of the shaft while creating minimal axial drag thereupon.

In operation, shaft 22 is forced into brushing contact with the tips of bristles 72, allowing the shaft to be pulled through the brush in both axial directions. In the retractive direction, wherein the shaft is retracted from chamber 18 into the bearing, any deposits on shaft 22 are brushed off. Preferably, bore 27" in valve body. 12' is somewhat larger than the diameter of shaft 22 creating a second annular space 75 therebetween such that deposits brushed off of shaft 22 can fall by gravity back into chamber 18. Thus, shaft 22 is, kept free of deposits during actuation thereof, and impairment of movement of the shaft in the bearing caused by coke deposits on the shaft is prevented.

Depending upon bristle density, brush 62 can have a secondary action ' as a shaft seal against particles being drawn directly into bearing 26. However, for optimal scraping effectiveness, a relatively low bristle density is preferred.

Figure 4:
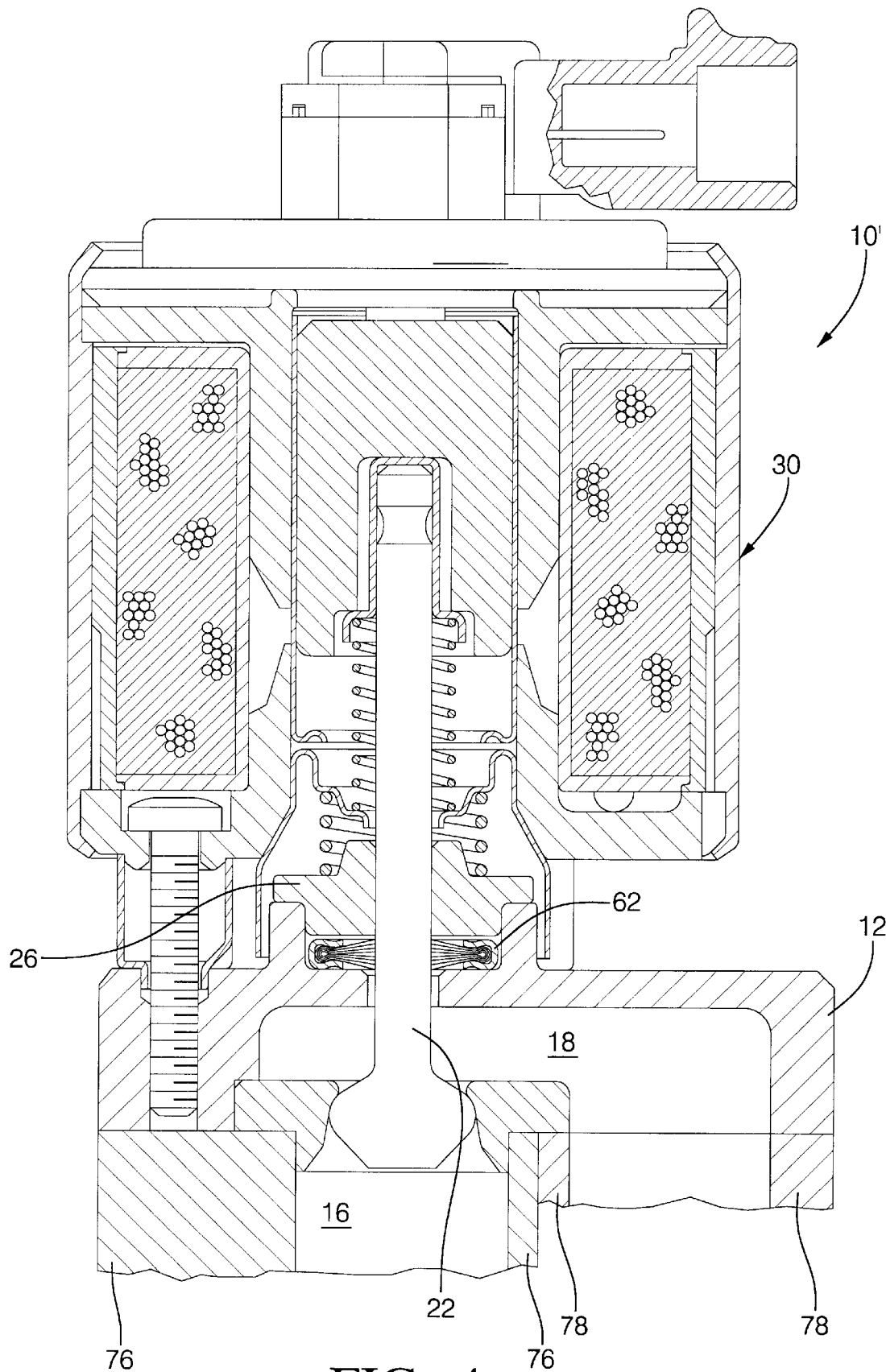
FIG. 4 is an elevational cross-sectional view of an improved exhaust gas recirculation valve assembly incorporating an anti-coking shaft brush in accordance with the invention.

Referring to FIG. 4, an improved EGR valve 10' is shown including anti-coking shaft brush 62. Valve 10' is shown connected between the exhaust and intake manifolds 76 and 78, respectively, of an internal combustion engine 80 for metering of exhaust gases therebetween.

The foregoing description of the preferred embodiment of the invention has been presented for the purpose of illustration and description. It is not intended to be exhaustive nor is it intended to limit the invention to the precise form disclosed. It will be apparent to those skilled in the art that the disclosed embodiments may be modified in light of the above teachings. The embodiments described are chosen to provide an illustration of principles of the invention and its practical application to enable thereby one of ordinary skill in the art to utilize the invention in various embodiments and with various modifications as are suited to the particular use contemplated. Therefore, the foregoing description is to be considered exemplary, rather than limiting, and the true scope of the invention is that described in the following claims.

What is claimed is:

1. An anti-coking apparatus for a pintle shaft in a valve, comprising an annular brush disposed in said valve and surrounding said pintleshaft and having bristles disposed radially inwards into contact with said pintle shaft to brush coking deposits from said pintle shaft during axial actuation of said shaft in said valve wherein said valve includes an internal chamber from which said pintle shaft extends and a shaft bearing disposed in a wall of said valve, and wherein said brush is disposed between said chamber and said bearing.

2. An anti-coking apparatus in accordance with claim 1 wherein said bristles are metallic.

3. An anti-coking apparatus in accordance with claim 2 wherein said metal is selected from the group consisting of stainless steel, mild steel, and brass.

4. An anti-coking apparatus in accordance with claim 1 wherein said bristles are retained by a folded metallic retainer.

5. An anti-coking apparatus in accordance with claim 1 wherein said valve further includes a second axial bore having a diameter, a diameter of said shaft being smaller than said diameter of said second bore whereby said deposits brushed off of said shaft can fall into said internal chamber.

6. An exhaust gas recirculation valve for an internal combustion engine, comprising an anti-coking apparatus for a pintle shaft in said valve including an annular brush surrounding said pintle shaft and having bristles disposed radially inwards into contact with said pintle shaft to brush coking deposits from said pintle shaft during axial actuation of said shaft in said valve wherein said valve further includes a first axial bore, said first axial bore and said shaft bearing defining a space therebetween wherein said brush is disposed, said space having an axial length and said brush having an axial length, said brush axial length being slightly less than said space axial length whereby said brush is free to float axially within said space.

7. An exhaust gas recirculation valve in accordance with claim 6 wherein said bristles are retained by a folded metallic retainer.

8. An exhaust gas recirculation valve in accordance with claim 6 wherein said valve further includes an internal chamber and a second axial bore having a diameter, a diameter of said shaft being smaller than said diameter of said second bore whereby said deposits brushed off of said shaft can fall into said internal chamber.

9. An internal combustion engine, comprising an exhaust gas recirculation valve for an internal combustion engine, said valve having an anti-coking apparatus for a pintle shaft of said valve including an annular brush surrounding said pintle shaft and having bristles disposed radially inwards into contact with said pintle shaft to brush coking deposits from said pintle shaft during axial actuation of said shaft in said valve wherein said valve further includes a first axial bore and a shaft bearing disposed in a wall of said valve, said first axial bore and said bearing defining a space therebetween wherein said brush is disposed, said space having an axial length and said brush having an axial length, said brush axial length being slightly less than said space axial length whereby said brush is free to float axially within said space.

* * * * *